United States Patent
Borinato et al.

(10) Patent No.: US 8,881,842 B2
(45) Date of Patent: Nov. 11, 2014

(54) CONTROLLING METHOD OF ELECTRIC TOOL AND ELECTRIC TOOL CARRYING OUT THE CONTROLLING METHOD

(75) Inventors: Gianni Borinato, Schio (IT); Jiancheng Shen, Jiangsu (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 580 days.

(21) Appl. No.: 12/527,018

(22) PCT Filed: Feb. 13, 2008

(86) PCT No.: PCT/CN2008/000345
§ 371 (c)(1),
(2), (4) Date: Nov. 16, 2009

(87) PCT Pub. No.: WO2008/101408
PCT Pub. Date: Aug. 28, 2008

(65) Prior Publication Data
US 2010/0089600 A1   Apr. 15, 2010

(51) Int. Cl.
*B25B 23/147*  (2006.01)
*B25B 23/14*   (2006.01)
*B23P 19/06*   (2006.01)
*B25B 21/00*   (2006.01)

(52) U.S. Cl.
CPC ............. *B25B 23/147* (2013.01); *B25B 21/008* (2013.01); *B25B 23/14* (2013.01); *B23P 19/066* (2013.01)
USPC ................................ 173/1; 173/176; 173/178

(58) Field of Classification Search
CPC ........ B25B 23/147; B25B 23/14; B25B 21/00
USPC ................................ 173/1, 176, 178; 318/434
See application file for complete search history.

(56) References Cited

U.S. PATENT DOCUMENTS 3,845,373 A * 10/1974 Totsu et al. .................... 318/434
3,962,619 A *  6/1976 Nishimura et al. ........... 318/571
(Continued)

FOREIGN PATENT DOCUMENTS

CN    1105614 A    7/1995
CN    2762964 Y    3/2006
(Continued)

OTHER PUBLICATIONS

International Search Report PCT/CN2008/000345, Jun. 5, 2008, 6 pages.

(Continued)

*Primary Examiner* — Michelle Lopez
(74) *Attorney, Agent, or Firm* — Howard & Howard Attorneys PLLC

(57) ABSTRACT

The invention relates to a power tool, which comprises a motor for driving a tool bit rotating, the motor attains a rotational speed, a source for supplying an electric current to said motor, a sensor for measuring said current, and a control device. The control device fulfills the task of detection of a variation of the slope of the current in the course of time, and generates a control signal. The rotational speed of the tool is reduced in response to the control signal. The present invention automatically detects whether the work piece operated by the tool bit reaches a predetermined position by providing electronic control means. It may make sure that the screw is driven into a piece of wood and does not go beyond the predetermined position once detect that the work piece reaches the position and carries out the changing action.

35 Claims, 6 Drawing Sheets

(56) References Cited

U.S. PATENT DOCUMENTS

| | | | |
|---|---|---|---|
| 4,013,895 A | | 3/1977 | Akiyoshi et al. |
| 4,249,117 A | * | 2/1981 | Leukhardt et al. ............ 318/275 |
| 4,386,305 A | | 5/1983 | Kohzai et al. |
| 5,410,229 A | * | 4/1995 | Sebastian et al. ............ 318/434 |
| 5,563,482 A | | 10/1996 | Shaw et al. |
| 5,650,574 A | | 7/1997 | Sato et al. |
| 6,344,724 B1 | | 2/2002 | Kakino et al. |
| 6,479,958 B1 | | 11/2002 | Thompson et al. |
| 7,091,683 B1 | | 8/2006 | Smith et al. |
| 7,243,734 B2 | | 7/2007 | Wu |
| 7,410,006 B2 | * | 8/2008 | Zhang et al. ...................... 173/1 |
| 2006/0152179 A1 | | 7/2006 | Chang |
| 2006/0185869 A1 | | 8/2006 | Arimura |
| 2006/0201688 A1 | | 9/2006 | Jenner et al. |
| 2011/0303427 A1 | | 12/2011 | Tang |

FOREIGN PATENT DOCUMENTS

| | | |
|---|---|---|
| CN | 1824464 A1 | 8/2006 |
| CN | 1962199 A | 5/2007 |
| CN | 101499763 A | 8/2009 |
| CN | 201405095 Y | 2/2010 |
| CN | 201405335 Y | 2/2010 |
| DE | 196 20 782 A1 | 12/1996 |
| EP | 0 087 373 A1 | 8/1983 |
| EP | 0187353 | 7/1986 |
| EP | 0 264 034 A2 | 4/1988 |
| EP | 0 264 698 A2 | 4/1988 |
| EP | 0 285 815 A1 | 10/1988 |
| JP | 5689485 | 7/1981 |
| JP | 57114373 A | 7/1982 |
| JP | 03-032531 | 2/1991 |
| JP | 08141928 A | 4/1996 |
| TW | 1297299 | 2/2007 |
| WO | 02098612 A1 | 12/2002 |
| WO | WO 03 090974 A1 | 11/2003 |

OTHER PUBLICATIONS

English Language Abstract for EP0187353 extracted from Espacenet database, Mar. 13, 2013, 1 page.

English language translation for JP56-89485, Official Gazette for Kokai Patent Application, pp. 455-458, Published Jul. 20, 1981.

English Language Abstract for JP03-032531, 1 page, Date of publication: Feb. 13, 1991.

English language abstract and machine-assisted English translation of EP 0 087 373 extracted from www.espace.com on Mar. 26, 2014; 32 pages.

English language abstract and machine-assisted English translation of EP 0 264 034 extracted from www.espace.com on Mar. 26, 2014; 22 pages.

English language abstract and machine-assisted English translation of EP 0 264 698 extracted from www.espace.com on Mar. 26, 2014; 17 pages.

English language abstract and machine-assisted English translation of EP 0 285 815 extracted from www.espace.com on Mar. 26, 2014; 27 pages.

English language abstract and machine-assisted English translation of DE 196 20 782 extracted from www.espace.com on Mar. 26, 2014; 17 pages.

Supplementary International Search Report for Application No. EP 08 70 6520; search completed on Sep. 25, 2013; 9 pages.

English language abstract and machine-assisted translation for CN1962199 extracted from the espacenet.com database on Jul. 1, 2014, 11 pages.

English language abstract and machine-assisted translation for CN101499763 extracted from the espacenet.com database on Jul. 1, 2014, 23 pages.

English language abstract and machine-assisted translation for CN201405095 extracted from the espacenet.com database on Jul. 1, 2014, 46 pages.

English language abstract and machine-assisted translation for CN201405335 extracted from the espacenet.com database on Jul. 1, 2014, 18 pages.

English language abstract and machine-assisted translation for JP08141928 extracted from the PAJ database on Jun. 30, 2014, 14 pages.

U.S. Appl. No. 13/143,325, filed Aug. 31, 2011, which is the National Phase Application of WO2010/075820, US Pub. No. 2011/0303427; Tang, Xiangyang.

* cited by examiner

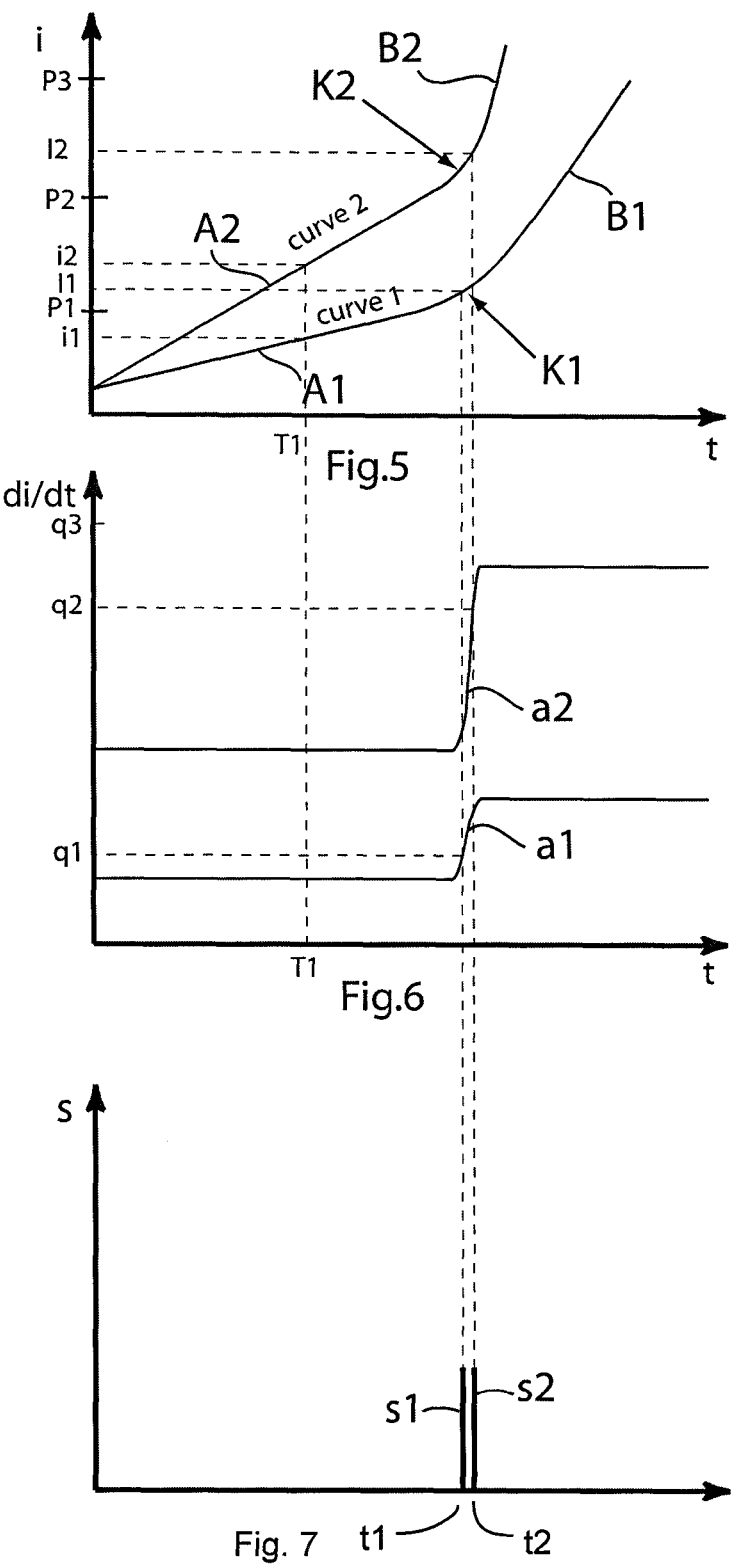

US 8,881,842 B2

CONTROLLING METHOD OF ELECTRIC TOOL AND ELECTRIC TOOL CARRYING OUT THE CONTROLLING METHOD

CROSS REFERENCE TO RELATED APPLICATION

This application claims priority to and all the advantages of International Application No. PCT/CN2008/000345, filed on Feb. 13, 2008, which claims priority to Chinese Patent Application No. 200710020155.1, filed on Feb. 16, 2007.

FIELD OF THE INVENTION

The invention relates to a method for controlling an electric tool, preferably an electronic screw driver, which tool is supplied by an electric current for generating a rotational speed. It also relates to an electric tool, preferably an electric screw driver, for carrying out the method.

BACKGROUND OF THE INVENTION

In the present power tools, such as electric screw drivers, which is driven by a rotary motor and screw into a board of wood via supplying current from a loaded power. The screws may have different diameters. And the shapes of the heads of different screws are different from each other. Thus different circumstance will occur when different screws are driven into the same board of wood. Additionally, if the same screw is driven into different material, the hardness of different pieces of wood may be different, current of the electric screw drivers will be different. Normally, during using of the screw drivers, the user should drill the screw head up to a surface close to the workpiece, thereby, the user needs to watch the drilling process very carefully in order to stop the motor when the screw head reaches the end. Thus, the screw may not go too deeply into the piece of wood what it undesirable. Otherwise, it can prevent the motor from overloading when the screw head is incautiously screwed into the wood board.

It is prior art to use some overload protection device. This may be a mechanical clutch, which disengage the tool bit from the driving motor when the motor current exceeds a predetermined limit value. A torque collar, which is rotatable and marked with plurality of scales, is provided in the front of the housing of which power tool has such overload protection device. These scales indicate the torque limiter. The user should preset the limited torque value by the rotatable torque collar, that is, when the output torque reaches or exceeds the predetermined value, the clutch will automatically start to disengage the tool bit of the power tool and the motor. Additionally, electric screwdrivers with such overload protection device has a sleeve extending from the front end of the housing, the front end of the sleeve is align with that of the tool bit of the electric screwdriver. When the screw head reaches the wood board surface, the front end of the sleeve also reaches it, if the screw is pressed further, the sleeve will be biased to actuate the clutch in the housing, thereby disengage the tool bit and the motor. However, the above mechanical clutch is complex in structure and it is complicated and costly to be made.

SUMMARY OF THE INVENTION

It is an object of the invention to provide a method for an electric tool which method makes sure in a tool that the work piece operated by the tool bit reaches a predetermined position, and that the work piece does not go beyond this position.

And it is also an object of the invention to provide a tool of the afore-mentioned type in which such method can be carried out.

According to one aspect of the invention, there is provided a method for controlling an electric tool, which is supplied by an electric current for generating a rotational speed, comprising the steps of
  measuring the current supplied to said electric tool in dependence on time;
  forming the second or nth derivative of said current in dependence on time, said n≥3;
  generating a control signal according to said second or nth derivative; and
  changing the rotational speed of said electric tool in response to said control signal.

According to another aspect of the invention, there is provided an electric tool, having
  a motor for driving a tool bit, such that the tool bit attains a rotational speed,
  a source for supplying an electric current to said motor,
  a sensor for measuring said current, and
  control means for detection of a pulse in the second or nth derivative of the variation of the slope of said current in the course of time, thereby generating a control signal, and for changing the rotational speed of said tool in response to said control signal.

According to one aspect of the invention, there is provided a method for controlling an electric tool, which is supplied by an electric current for generating a rotational speed, comprising the steps of
  a. measuring the current supplied to said electric tool at a predetermined point of time,
  b. selecting at said predetermined point of time
    b1) a first predetermined derivative value if the measured current is below a predetermined first threshold value or
    b2) a second predetermined derivative value if the measured current is above the predetermined first threshold value, wherein said second predetermined derivative value is higher than said first predetermined derivative value,
  c. forming the first derivative of said current in dependence of time,
  d. generating a control signal from said first derivative when said first derivative has reached said first or second predetermined derivative value, and
  e. changing the rotational speed of said electric tool in response to said control signal.

According to another aspect of the invention, the electric tool, may comprise
  a) a motor for driving a tool bit, such that the tool bit attains a rotational speed,
  b) a source for supplying an electric current to said motor,
  c) a sensor for measuring said current, and
  d) control means
    d1) for detection of a variation of the slope of said current in the course of time,
    d2) for selecting a first or second predetermined derivative value in dependence of the value of said current at a predetermined point of time,
    d3) for generating a control signal from said first or second predetermined value, and
    d4) for changing the rotational speed of said electric tool in response to said control signal.

Compared with the prior art, the present invention automatically detects whether the work piece operated by the tool bit reaches a predetermined position by providing electronic control means. It may make sure that the screw is driven into a piece of wood and does not go beyond the predetermined position once detect that the work piece reaches the position and carries out the changing action. There is no complicated mechanical clutch so that it is simple to be made and the cost is decreased.

BRIEF DESCRIPTION OF THE DRAWINGS

Other embodiments and advantages will be obvious from the following description of the drawings, depicting specific embodiments of the invention.

FIG. 5 is a diagram of an electronic screw driver, wherein two currents i1, i2 of different conditions are illustrated versus time.

FIG. 6 is a diagram, wherein the first derivatives di/dt of the currents i1 and i2 are depicted versus time.

FIG. 7 is a diagram, wherein control signals s1, s2 obtained from processing of the derivatives of FIG. 6 are illustrated versus time.

DESCRIPTION OF PREFERRED EMBODIMENTS

The control method of the present invention adapted to be used on many kinds of power tools. Electric screwdriver is described below as a preferred embodiment.

Figure 1:
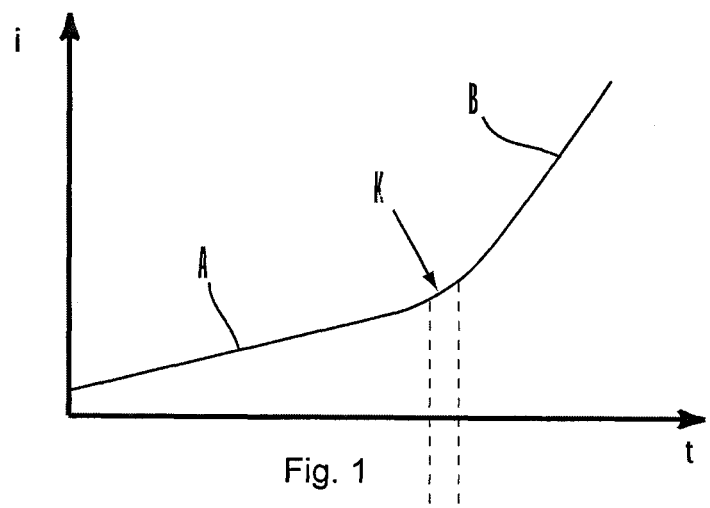
FIG. 1 is a typical diagram of an electronic screw driver in the prior art, wherein the current is illustrated versus time.

According to FIG. 1, an i(t) diagram of an electronic screw driver is illustrated. With regard to FIG. 4, the user presses the screw driver 2 against a working head 14 which shall be driven into a board of wood 16, the working head in this embodiment is a screw. Pressing is performed with approximately constant pressure. The letter t represents the time that the screw drilling into the board and consequently the position of screw in the board. And the letter i represents the current supplied to the electric motor of the screw driver and thereby the load or force that is provided by the motor.

Curve in FIG. 1 contains a first portion A, a second portion K and a third portion B. Wherein, the first portion A is an increasing slope and which represents the screwing process of the screw main body drilling into the board of wood. This rise may be linear or slightly bended or curved. The second portion is followed with the first portion A. It may be called as knee portion K. This knee portion K is a positive variation of the slope. In other words: It is a sudden variation having on upward inclination with respect to the first portion A. This represents the start of touching on the surface of the wood board by the screw head. And the third portion B is followed with the knee portion K. This rise may again be linear or slightly bonded or curved. Yet, the curve B is much steeper than the curve A.

In fact, curve shown in FIG. 1 represents the working condition of a power tool which does not carry out the control method of the present invention, the third portion B of the curve represents that high current will be generated in the power tool and may lead to insert even the head into the piece of wood. Therefore, it is essential to take some action to avoid such an excessive current following the knee portion K.

When the screw is drill to a position responding to the knee portion K, further drilling will insert the screw head into the wooden board and maybe damage the motor. Therefore, the invention is based on the automatically detection of the knee portion K and then start precaution measures automatically.

The detection of the knee portion K in this embodiment will be explained with regard to FIGS. 2 and 3.

Figure 2:
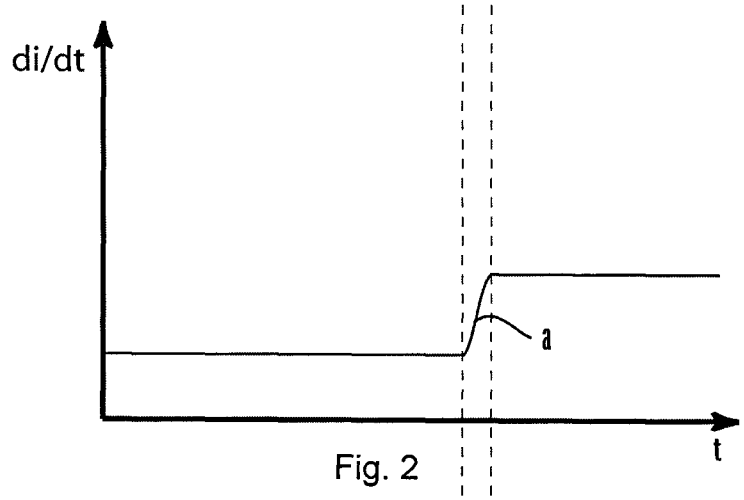
FIG. 2 is a diagram, wherein the first derivative of the current of FIG. 1 is depicted versus time.
Figure 3:
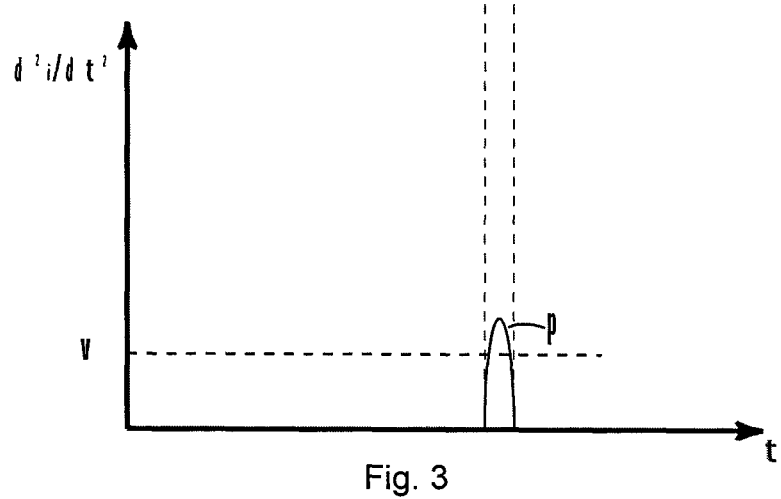
FIG. 3 is a diagram, wherein the second derivative of the current of FIG. 1 is depicted versus time.

In FIG. 2 the first derivative di/dt of the current i versus time t of the diagram of FIG. 1 is shown. The first and third portion A and B in FIG. 1 respectively are corresponding lines parallel to the base line of t in this figure, while the second portion K is a sharp positive increase or rise curve in this diagram.

According to FIG. 2, the second derivative $d^2i/dt^2$ of the current I shown in FIG. 1 is formed in dependence on time t. The values in the first and third portion are zero after being derivated twice, whereas the second portion K is shown as a parabola with downward opening. A kind of peak signal p is formed in the top region of the parabola, which is a particular region including the vertex. With regard to FIG. 4, a control signal s is generated when the peak signal p is formed. Of course, in the preferred embodiment, a predetermined threshold value v is set. The control signal s is only generated if the peak signal p is positive and exceeds the predetermined threshold value v. It is easy for a skilled person in this art, the control signal s may be generated after the first derivative of current i in dependence on time t is formed. For example, via a capacitor, the control signal s is generated after detection of the first derivative exceeding a predetermined threshold value.

Figure 4:
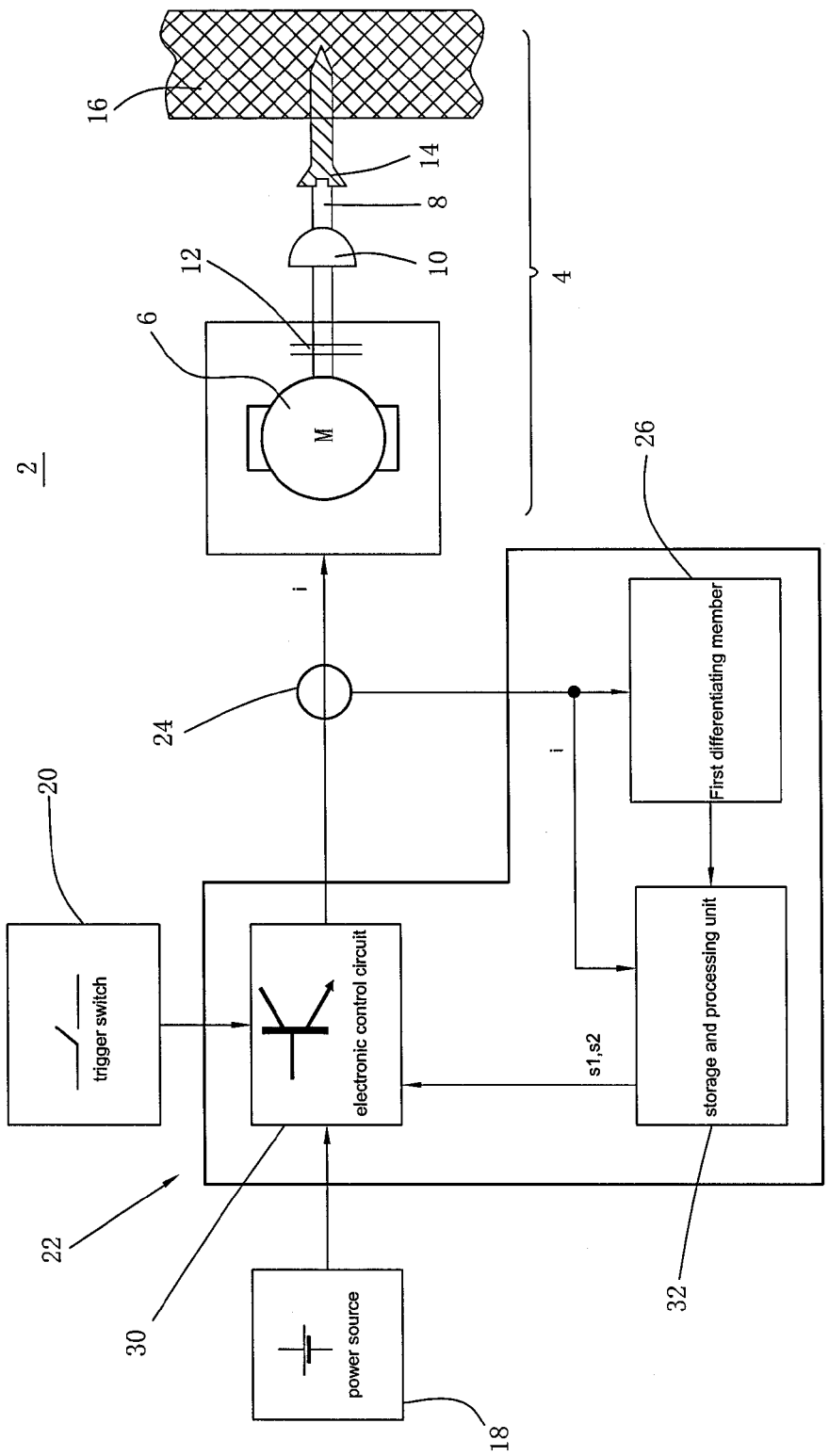
FIG. 4 is a work principle chart, which a power tool of the present invention in accordance with the first version of the invention is illustrated.

FIG. 4 illustrates an electric tool which carries out the control method of the above mentioned. Here below electric screw driver is also illustrated as the preferred embodiment. The electric screw driver 2 includes a working assembly 4, a power source 18 and a switch 20. The working assembly 4 includes an electric motor 6 for driving a tool bit 8 to rotate, and driving a screw 14 into a wooden board 16. The working head 14 is connected to the electric motor 6 via a mechanical spring, a clutch system 12 and a chuck 10 in serial. Of course, in the present embodiment, the clutch system 12 may be omitted. A power source 18, in this example is a DC source or a rechargeable battery, supplies an electric DC current i to the motor 6, provided a hand trigger switch 20 is closed. Of course, it is easy for a skilled person in this art, AC power source may be used to substitute the DC source of this embodiment.

An electronic control device 22 and a current sensor 24 are connected between the power supply 18 and the electric motor 6. The electric screw driver 2 also includes a first differentiating member 26 and a second differentiating member 28. In the present embodiment, the current sensor 24 detects the current i supplied to the motor and delivers a signal proportional to the current i measured by the sensor 24, to the first differentiating member 26. This first differentiating member 26 gets a first derivative di/dt in dependence on time t shown as FIG. 2, and generates a signal proportional to the first derivative, and then delivers it to the second differentiating member 28. The second differentiating member 28 gets again a second derivative shown as FIG. 3. Thus, the second differentiating member 28 generates a control signal s when a preset condition, which the peak signal p as mentioned above is positive and its value exceeds the predetermined threshold value v is occurred. In this embodiment, the control signal is used for reducing or interrupting the energy supply to the motor 6. In other words, the control signal s is used to bring the motor current i to a lower value or to zero for decreasing the rotational speed of the motor or stopping the motor. Of course, the control signal s may also be used to reverse the current i to obtain a quick stop of the motor 6. In this embodiment, the control signal s will be transmitted to a electronic control device 22, and corresponding actions will be carried out by the electronic control device 22. These actions may happen immediately or after a predetermined delay time after the occurrence of the peak signal p. The delay may be happened in the electronic control device 22 or be provided by a separate delay unit.

In FIG. 4, the electronic control device may includes a switch in the form of a transistor for turning off the current i supplying to the motor.

In the preferred embodiment, the electronic control device 22 may contain a microprocessor. And that the functions of the first differentiating members 26 and the second differentiating member 28 and possibly a delay member may be fulfilled by the software present in this microprocessor. In other words, the whole electronic control device 22 is a microprocessor.

In other alternative embodiments, the current i supplied to the motor 6 is measured in consecutive time intervals $\Delta t$, which may be equal to each other. The measured current i is digitally processed. In doing so, the first time derivatives di/dt measured in two consecutive time intervals $\Delta t$ are compared with each other. If this comparing shows that the first time derivative in two consecutive time intervals $\Delta t$ are substantially different from each other (this corresponds to the second derivative mentioned above), that means the screw head has reached the wood board 16, and the afore-mentioned control signal s is generated.

The afore-mentioned embodiment automatically detects whether the work piece operated by the tool bit reaches a predetermined position by providing electronic control means. It makes sure that the working head does not go beyond the predetermined position once detection of the working head reaches the position and carries out corresponding actions.

Figure 8:
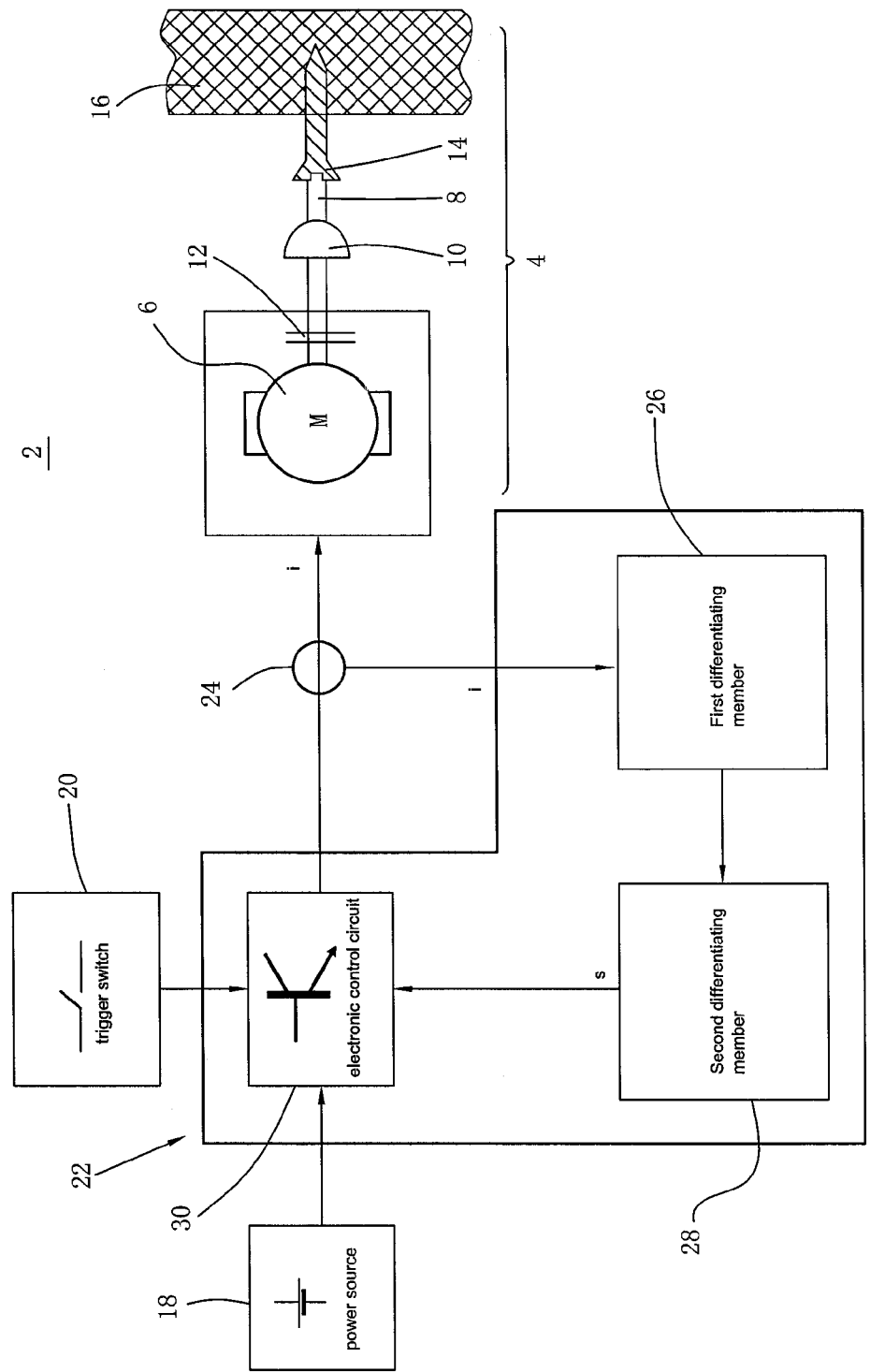
FIG. 8 is a work principle chart, which a power tool of the present invention in accordance with the second basis version of the invention is illustrated.

FIG. 8 is a work principle chart, which a power tool of the present invention in accordance with the second basis version of the invention is illustrated.

In FIGS. 5-8, a second basic version of the method and the power tool according to the invention is illustrated. Various embodiments will be described in dependence on the basic version of the invention.

The diagram of FIG. 5 shows the motor current i versus time t. In the present embodiment, the motor current i is a DC current of an electric screw driver which drives a tool bit. Two measured current curves A1 and A2 are illustrated. Again, the principle of clocking is used for measuring and processing the motor current i. It is a known technology for a person skilled in the art, the applicant will not describe it in detail. In the diagram of FIG. 6, derivatives of the current curve A1 and A2, respectively, are shown. The first curve A1 relates to a relatively soft work-piece, such as wood, and/or a relatively small screw, while the second curve A2 relates to a harder work-piece and/or a bigger screw. Whatever the condition is, measuring and processing for these curves A1, A2 is done in the control device 22 (shown in FIG. 8). In the preferred embodiment, the control device comprises a microprocessor.

In a preferred first embodiment of the second basic version, at a predetermined point of time T1, the current i is specifically measured. In the microprocessor, there is stored a single threshold value, which will be termed first threshold value P1. This first threshold value P1 may be, for instance, P1=5A at T1. If i1<5A at T1, it is determined that a soft board is worked on, and if i1>5A at T1, it is determined that a hard board is worked on. With regard to FIG. 6, if i1<5A, the microprocessor will assign a first predetermined derivative value q1, and if i1>5A, the microprocessor will assign a second predetermined derivative value q2. Both predetermined derivative values q1, q2 are stored in the microprocessor. The first predetermined derivative value q1 may be, for instance, q1=0.4 A/s, and the larger second predetermined derivative value q2 may be, for instance, q2=1 A/s. Thus, if the motor current i1 is below P1 at T1, the first predetermined derivative value q1 is selected, and if the current i1 is above P1 at T1, the second predetermined derivative value q2 is selected.

In FIG. 6, the first derivative of the current according to curve A1 and curve A2 is depicted as curves a1 and a2, respectively.

It will be realized from FIG. 6 that there is a steep increase portion of the curves a1 and a2 which is corresponding to the strongly bend portion of the curves A1 and A2, i.e. where the curve A1 and A2 have a knee portion K1 and K2, respectively. As afore-mentioned, the knees K1 and K2 represent that the screw heads touch the wooden work piece. These knees K1 and K2 are used in the microprocessor to form control signals s1 and s2 (as shown in FIG. 7), respectively. The predetermined first derivative values q1, q2 are located at the steep increase of the curves a1, a2, respectively.

As shown in FIG. 7, the first control signal s1 is generated in the microprocessor at the point of time t1, when the first derivative di/dt has reached the first predetermined derivative value q1. When the second curve A2 has to be considered according to the measurement at the point of time T1, the second control signal s2 is generated at the point of time t2, when the first derivative di/dt has reached the second predetermined derivative value q2.

In response to the control signal s1 or s2, the rotational speed of the DC motor attached to the power tool is reduced or the motor is even stopped.

In other words: At the predetermined point of time T1, for instance 1 or 2 seconds after starting the motor, the microprocessor reads the current i. If there is a small screw and/or a soft work-piece of wood, the current i is also relatively small, and the current will follow the first curve A1 shown as FIG. 5. The measured current at the first point of time T1 is the first current i1, which may be e.g. 3A, the microprocessor selects the first predetermined derivative value q1 (stored therein) to be compared with the first derivative di/dt. When di/dt reaches q1, the corresponding point of time is t1, the corresponding current is i1, the speed of the motor will be reduced by the first control signal s1 generated from the first predetermined derivative value q1. If the working head is a bigger screw and/or the work piece is a piece of harder wood board, the current will follow the second curve A2 shown as FIG. 5. Thus, the measured current at the point of time T1 is the second current i2 which is higher than the first current i1, for instance, i2–7A. Therefore, at T1 the microprocessor will select the predetermined derivative value q2 (stored therein). As soon as the value of di/dt on the curve a2 reaches q2, the corresponding point of time is t2, the corresponding current supplied to the motor is i2, the speed of the motor will be reduced by the generated second control signal s2.

In a preferred second embodiment of the second basic version, at a predetermined point of time T1, the current i is also specifically measured. Here it will be determined in the microprocessor whether the measured value of the motor current i at T1 is below a predetermined first threshold value P1, such as the illustrated current value i1, or whether it is above the predetermined first threshold value P1, but below a larger second predetermined threshold value P2, such as the illustrated current value i2. If it corresponds to the first current value i1, the first curve A1 is assigned a predetermined derivative value q1. And if it corresponds to the second current value i2, the second curve A2 is assigned a larger predetermined derivative value q2. From now on, the method will follow the steps as explained in the first embodiment. The first derivative di/dt at the knees K1, K2 is again used in the microprocessor to form a control signal s1 or s2, respectively.

It will be noted that in the first embodiment just one predetermined threshold value P1 is used, whereas in the second embodiment two predetermined threshold values P1 and P2 are used.

This may also apply to the second embodiment: If the working head is a very big screw and/or the work-piece is specifically hard, a third threshold value P3 (shown in FIG. 5) and a third predetermined derivative value q3 (shown in FIG. 6) which stored therein will be used in the microprocessor. It should be mentioned that then the set of predetermined threshold values P1, P2 and P3 as well as the predetermined derivative values q1, q2 and q3 is stored in the microprocessor for being individually called upon a request in accordance with the measured current i1, i2, and i3, respectively, at a predetermined point of time T1. Of course, even more sets of predetermined threshold values P and predetermined derivative values q may be used.

With a number of tests, (e.g. with different screws in specification and different kinds of wood in material and specification), the predetermined threshold values P and the predetermined derivative values q should be determined and stored in the microprocessor.

FIG. 8 illustrates an electric tool 2, in particular a screw driver, incorporating an embodiment of the present invention in accordance with the second basic version. Most of the members of the illustrated embodiment are the same with or similar to the members of FIG. 4. Therefore, the same reference numerals will be used.

The working assembly 4 of the electric screw driver shown on the right side of FIG. 8 includes an electric DC motor 6 for driving a tool bit 8 attached to a chuck 10. The chuck 10 is connected to the electric motor 6 via a mechanical spring and a clutch system 12. The tool bit 8 is provided for rotating and thereby driving a screw 14 into a wooden board 16. A power source 18 is a DC source, or maybe a rechargeable battery, supplies an electric DC current i to the motor 6, provided a hand trigger switch 20 is closed.

The power supply 18 is connected to the electric motor 6 via an electronic control device 22 and a current sensor 24. The current sensor 24 measures the current supplied to the motor and generates a signal proportional to the measured current and delivers a signal to a differentiating member 26. This differentiating member 26 generates a signal proportional to the first derivative di/dt in dependence on time t. The output of the differentiating member 26 is connected to the input of a storage and processing unit 32.

The storage and processing unit 32 has stored therein, according to the afore-mentioned first embodiment, a single threshold value P1 and a first and second predetermined derivative value q1 and q2, respectively. At a predetermined point of time T1, the storage and processing unit 32 selects the first predetermined derivative value q1, if the measured current i1 is below the threshold value P1, or it selects the second predetermined derivative value q2, if the measured current i2 is above the threshold value P1. The second predetermined derivative value q2 is larger than the first predetermined derivative value q1. The storage and processing unit 32 also generates a corresponding control signal s1 or s2, when the first derivative di/dt has reached the first or second predetermined derivative value q1, q2. Here the screw head has reached the piece of wood. And the storage and processing unit 32 supplies the control signal s1 or s2 to the electronic control device 22. This control device 22 provides for reducing or interrupting the energy supply to the motor 6. In other words, the control signal s1, s2 is used to bring the motor current i to zero or to another lower value for stopping the motor or decreasing the rotational speed of the motor to substantially zero. In the present embodiment the control signal s acts on an electronic control circuit 30 for this purpose. This control may happen immediately or after a predetermined delay time after the occurrence of the signal p. This signal s1 or s2 may also be used for reversing the current I to obtain a quick stop of the motor 6.

In the preferred embodiment, the electronic control device 22 may contain a microprocessor, and the functions of the differentiating member 26, the storage and processing unit 32 and also of the electronic control circuit 30 and possibly of a delay member (not shown) for delaying signal s may be fulfilled by the software of this microprocessor. In other words: the whole electronic control device 22 may be represented by a microprocessor.

Figure 9:
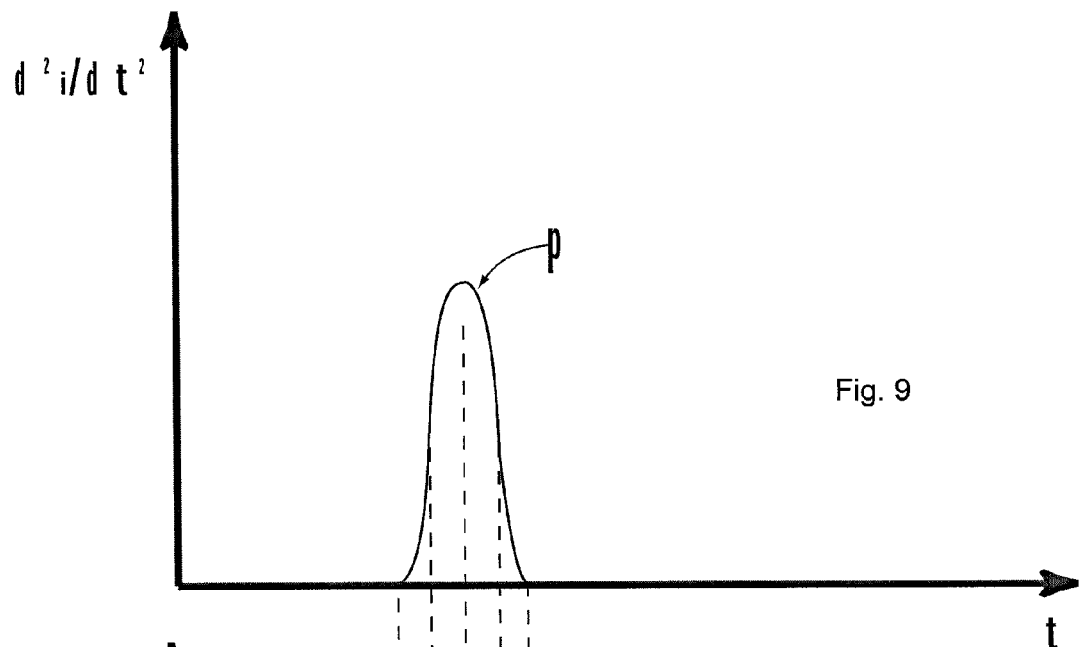
FIG. 9 illustrates the second derivation of the current versus time of an electronic screw driver, as FIG. 3.
Figure 10:
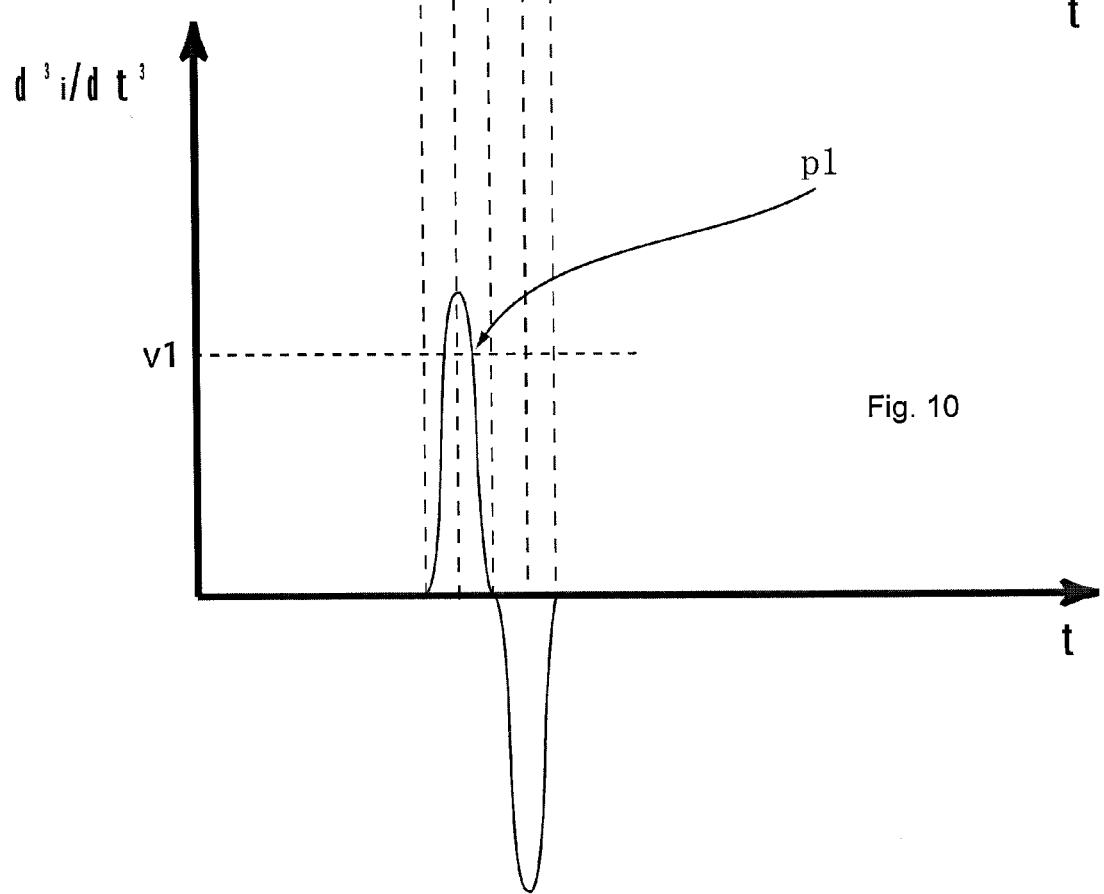
FIG. 10 shows the third derivation of the current versus time, as obtained from FIG. 9.
Figure 11:
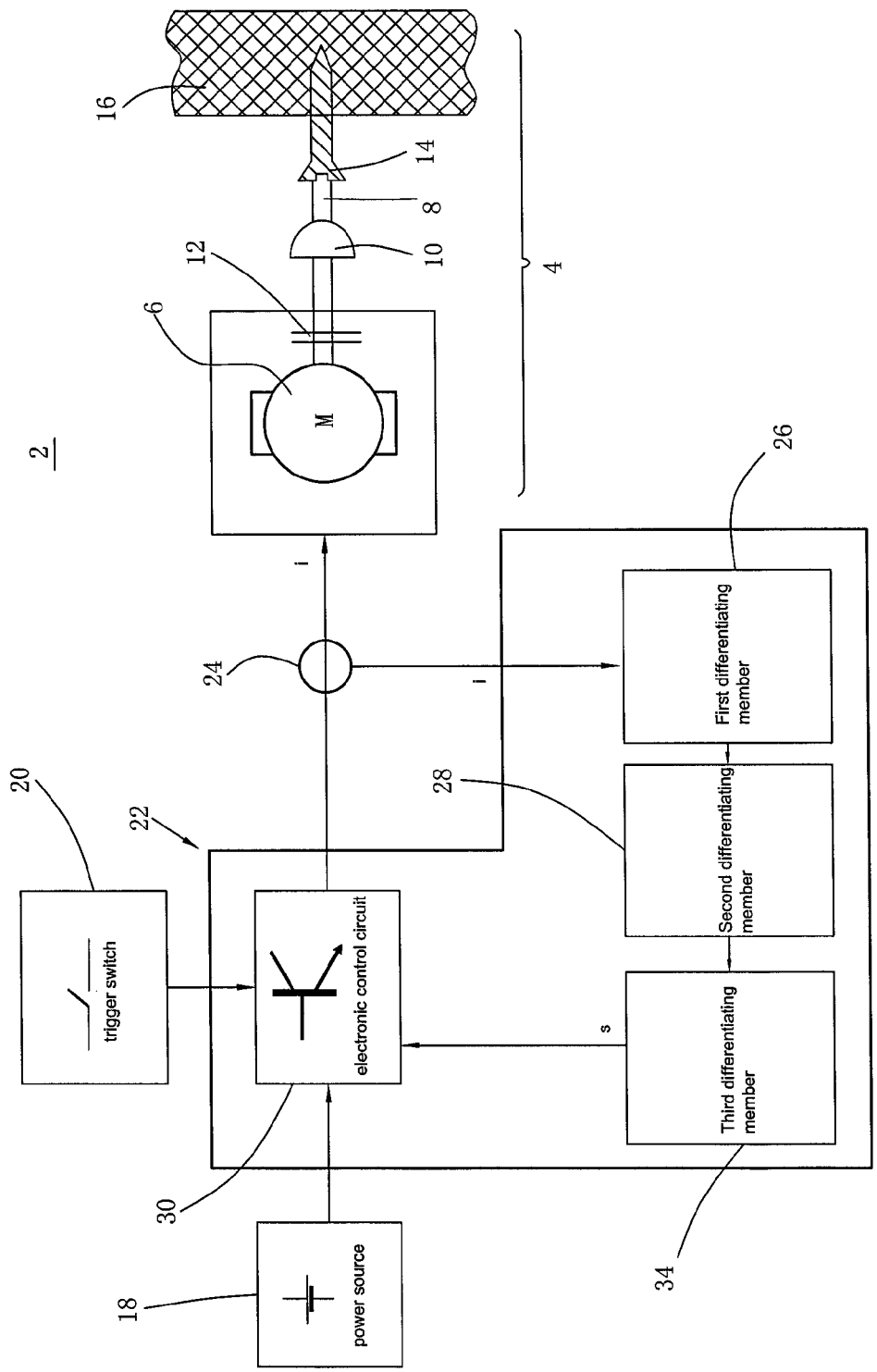
FIG. 11 is a work principle chart, which a power tool of the present invention in accordance with the third version of the invention is illustrated.

In FIGS. 9-11 a third basic version of the method and the power tool according to the invention is illustrated. It is an extent based on the first version as explained with reference to FIGS. 1-4. Therefore, only the differences will now be described. This third basic version uses the third derivative of the current i in dependence on time for reducing the speed of a tool 2.

In this embodiment, the method follows the various steps shown in and described with reference to FIGS. 1 to 3. In FIG. 9 the second derivative $d^2i/dt^2$ in dependence on time t is shown as a repetition, which has already been shown in FIG. 3. Shown as FIG. 10, the third derivative $d^3i/dt^3$ is generated from the second derivative $d^2i/dt^2$. And when the peak of the third derivative $d^3i/dt^3$ appears and when its value is positive and it exceeds a given threshold value v1, the control signal s is generated. The signal s is correspondingly used for reducing the speed of the electric tool 2.

A skilled person in the art knows accordingly to generate a control signal s through measuring the $4^{th}$, $5^{th}$ or higher nth derivative. It is easy to conclude, so the applicant will not describe in details here.

Shown as the circuit illustrated in FIG. 11, it will be noted that the output signal of the second differentiating member 28 is supplied to a third differentiating member 34, in which the third derivative $d^3i/dt^3$ is formed. Of the output signal of the third differentiating member 34, the positive pulse p1 is fed into the electronic control circuit 30. It is considered to be the control signal s. By means of the electronic control circuit 30, it causes a reduction or even complete elimination of the DC current i in the motor 6.

Again it must be noted that all elements composed of the control device 22 can be replaced by a microprocessor.

In accordance with the afore-mentioned second embodiment, the storage and processing unit 32 may have stored therein a predetermined derivative value q2. Or it may contain plurality sets of predetermined derivative values q1, q2, q3 . . . and threshold value P1, P2, P3 for processing.

The procedure and protection apparatus described above in FIGS. 5-8 again have the advantage that a fast and reliable response is obtained when the head of the screw 14 reaches the board 16. The protection apparatus is all-electronic.

It should be noted that the first derivative, the second derivative or the higher derivative is not only a derivative defined in mathematics, but also simple equivalents based on the differentiating principle of engineering practice. For example, the first derivative may also be represented as a current change $\Delta i$ between consecutive time intervals $\Delta t$, that is $\Delta i/\Delta t$. In order to be easily used in engineering, $\Delta t$ should be a extremely small constant value, such as $\Delta t=10$ ms. Thus, if the differences of the current is checked continuously, a counting for a first derivative should be realized equivalently. Accordingly, similar equivalents for the second derivative and the nth derivative, $n\geq 3$, should be contained in the meaning of derivative in the present invention.

Electric screw driver is illustrated above as a preferred embodiment, of course, the control method of the present invention may also be used on other power tools, such as electric drill, electric wrench and so on. It is easy to be realized according to the above mentioned embodiments for a person skilled in the art, so the applicant will not describe in details.

The invention claimed is:

1. A method for controlling an electric tool, which is supplied by an electric current for generating a rotational speed, said method comprising the steps of:
   measuring the current supplied to the electric tool in dependence on time;
   calculating a second or higher derivative of the current in dependence on time, wherein the second derivative of the current in dependence on time is calculated as a derivative of a first derivative of the current in dependence on time, and the higher derivative is calculated as a derivative of an nth derivative of the current in dependence on time where $n\geq 2$;
   generating a control signal according to the second or higher derivative only when the second or higher derivative is positive and exceeds a predetermined threshold value; and
   changing the rotational speed of the electric tool in response to the control signal.

2. The method in accordance with claim 1, wherein said step of measuring the current supplied to the electric tool is further defined as measuring the current supplied to the electric tool in consecutive time intervals, said method further comprising the steps of determining the first derivatives of two consecutive time intervals and comparing the first derivatives of the two consecutive time intervals to each other, and wherein said step of generating a control signal is further defined as generating a control signal according to a second or higher derivative only when the first derivatives of the two consecutive time intervals are different from each other.

3. The method in accordance with claim 1, further comprising the step of delaying the control signal.

4. The method in accordance with claim 1, wherein said step of changing the rotational speed of the electric tool is further defined as setting the rotational speed of the electric tool to a reduced level or to zero in response to the control signal.

5. The method in accordance with claim 1, further comprising the step of supplying a DC current to the electric tool, and wherein said step of changing the rotational speed of the electric tool is further defined as reversing the DC current, thereby bringing the electric tool to a stop, in response to the control signal.

6. An electric tool, comprising
   a motor for driving a tool bit, such that the tool bit attains a rotational speed;
   a source for supplying an electric current to said motor;
   a sensor for measuring the current; and
   a control means configured to detect a pulse in a second or higher derivative of a slope of the current in the course of time, generate a control signal, and change the rotational speed of said electric tool in response to the control signal, wherein the second derivative of the current is calculated as a derivative of a first derivative of the current in the course of time, and the higher derivative is calculated as a derivative of an nth derivative of the current in the course of time where $n\geq 2$.

7. The electric tool in accordance with claim 6, wherein said sensor measures the current in consecutive time intervals, and wherein said control means determine the first derivation of the current in each of the time intervals, compare the first derivatives of two consecutive time intervals with each other, and issue the control signal if the first derivatives of the two consecutive time intervals are different from each other.

8. The tool in accordance with claim 7, wherein the control signal is generated by said control means when the first or second derivative is positive and exceeds a predetermined threshold value.

9. The electric tool in accordance with claim 6, wherein said control means comprises a microprocessor.

10. The electric tool in accordance with claim 6, wherein the control signal is used for setting the rotational speed of said motor to a reduced level or to zero.

11. The electric tool in accordance with claim 6, further comprising a switch for turning off the current supplied to said motor in response to the control signal.

12. The electric tool in accordance with claim 6, wherein said control means generates the control signal to reverse the current supplied to said motor, thereby bringing said motor to a stop.

13. The electric tool in accordance with claim 6, further comprising delay means for delaying the control signal.

14. The electric tool in accordance with claim 13, wherein the delay of said delay means can be set by a user of said tool.

15. A method for controlling an electric tool, which is supplied by an electric current for generating a rotational speed, said method comprising the steps of
   measuring the current supplied to the electric tool at a predetermined point of time;
   selecting at the predetermined point of time a first predetermined derivative value if the measured current is below a predetermined first threshold value or a second predetermined derivative value if the measured current is above the predetermined first threshold value, wherein the second predetermined derivative value is higher than the first predetermined derivative value;
   forming the first derivative of the current in dependence of time;
   generating a control signal from the first derivative when the first derivative has reached the first or second predetermined derivative value; and
   changing the rotational speed of the electric tool in response to the control signal.

16. The method in accordance with claim 15, wherein the second predetermined derivative value is selected when the measured current is also below a predetermined second threshold value which is higher than the first threshold value.

17. The method in accordance with claim 16, further comprising the step of providing a set of fixed values for different conditions wherein the set includes the first and said second predetermined derivative values.

18. The method in accordance with claim 17, further comprising the step of providing a set of predetermined threshold values wherein the set includes the first and second threshold values.

19. The method in accordance with claim 18, further comprising the step of storing the set of predetermined derivative values and/or predetermined threshold values in a microprocessor.

20. The method in accordance with claim 15, further comprising the step of delaying the control signal.

21. The method in accordance with claim 15, wherein said step of changing the rotational speed of the electric tool is further defined as setting the rotational speed of the electric tool to a reduced level or to zero in response to the control signal.

22. The method in accordance with 15, further comprising the step of supplying a DC current to the electric tool.

23. The method in accordance with claim 22, wherein said step of changing the rotational speed of the electric tool is further defined as reversing the DC current, thereby bringing the electric tool to a stop, in response to the control signal.

24. An electric tool, comprising
   a motor for driving a tool bit, such that the tool bit attains a rotational speed;
   a source for supplying an electric current to said motor;
   a sensor for measuring the current; and
   a control means configured to:
      detect a variation of the slope of the current in the course of time;
      select a first or second predetermined derivative value in dependence of the value of the current at a predetermined point of time;
      generate a control signal from the first or second predetermined derivative value; and
      change the rotational speed of said motor in response to the control signal.

25. The electric tool in accordance with claim 24, wherein said control means comprises a microprocessor.

26. The electric tool in accordance with claim 24, wherein the control signal of said control means is determined for setting the rotational speed of said motor to a reduced level or to zero.

27. The electric tool in accordance with claim 24, further comprising a switch for turning off the current supplied to said motor, in dependence on the control signal.

28. The electric tool in accordance with claim 24, wherein said control means generates the control signal to reverse the current supplied to said motor, thereby bringing said motor to a stop.

29. The electric tool in accordance with claim 24, further comprising delay means for delaying the control signal.

30. The electric tool in accordance with claim 29, wherein the delay of said delay means can be set by a user of said tool.

31. The electric tool in accordance with claim 24, wherein said control means has stored therein a set of predetermined threshold values and/or a set of predetermined derivative values.

32. A method for controlling an electric tool, which is supplied by an electric current for generating a rotational speed, said method comprising the steps of:
   measuring the current supplied to the electric tool in dependence on time and in consecutive time intervals;
   calculating a second or higher derivative of the current in dependence on time, wherein the second derivative of the current in dependence on time is calculated as a derivative of a first derivative of the current in dependence on time, and the higher derivative is calculated as a derivative of an nth derivative of the current in dependence on time where $n \geq 2$;
   determining the first derivatives of two consecutive time intervals and comparing the first derivatives of the two consecutive time intervals to each other;
   generating a control signal according to the second or higher derivative only when the first derivatives of the two consecutive time intervals are different from each other; and
   changing the rotational speed of the electric tool in response to the control signal.

33. The method in accordance with claim 32, further comprising the step of delaying the control signal.

34. The method in accordance with claim 32, wherein said step of changing the rotational speed of the electric tool is further defined as setting the rotational speed of the electric tool to a reduced level or to zero in response to the control signal.

35. The method in accordance with claim 32, further comprising the step of supplying a DC current to the electric tool, and wherein said step of changing the rotational speed of the electric tool is further defined as reversing the DC current, thereby bringing the electric tool to a stop, in response to the control signal.

* * * * *